United States Patent
Cho et al.

(10) Patent No.: US 10,549,599 B2
(45) Date of Patent: Feb. 4, 2020

(54) HYBRID TYPE HEATING SYSTEM CAPABLE OF SUPPLYING HEAT AND HOT WATER

(71) Applicant: KOREA INSTITUTE OF ENERGY RESEARCH, Daejeon (KR)

(72) Inventors: Chong Pyo Cho, Daejeon (KR); Young Dug Pyo, Daejeon (KR); Young Jun Cho, Cheongju-si (KR); Jin Young Jang, Daejeon (KR); Wook Hyun Lee, Daejeon (KR); Young Jin Shin, Daejeon (KR); Gang Chul Kim, Daejeon (KR); Oh Seuk Kwon, Sejong (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 548 days.

(21) Appl. No.: 15/202,029

(22) Filed: Jul. 5, 2016

(65) Prior Publication Data
US 2017/0008367 A1 Jan. 12, 2017

(30) Foreign Application Priority Data

Jul. 6, 2015 (KR) .......... 10-2015-0095844
Dec. 14, 2015 (KR) .......... 10-2015-0178111

(51) Int. Cl.
*B60H 1/00* (2006.01)
*B60H 1/22* (2006.01)
(Continued)

(52) U.S. Cl.
CPC ....... *B60H 1/00278* (2013.01); *B60H 1/2209* (2013.01); *B60H 1/2212* (2013.01);
(Continued)

(58) Field of Classification Search
CPC .................. F24H 6/00; F24H 9/2035
(Continued)

(56) References Cited

U.S. PATENT DOCUMENTS 3,304,004 A * 2/1967 Hraboweckyj ...... B60H 1/2212
                                                    123/142.5 R
3,763,848 A * 10/1973 Williams .................. F24C 3/14
                                                    126/101
(Continued)

FOREIGN PATENT DOCUMENTS

GB  2284662 A * 6/1995 ......... B60H 1/00278
JP  05262144 A * 10/1993 ......... B60H 1/00278
(Continued)

OTHER PUBLICATIONS

Chun, KR20100092631A English machine translation, Aug. 23, 2010 (Year: 2010).*
(Continued)

*Primary Examiner* — Edelmira Bosques
*Assistant Examiner* — Phillip Decker
(74) *Attorney, Agent, or Firm* — Harness, Dickey & Pierce, P.L.C.

(57) ABSTRACT

There is provided a hybrid type heating system capable of heating air and water together. As an embodiment, the present invention provides a technology of carrying out heating not using a battery in an electric vehicle, a technology of heating a battery so that performance of the battery does not decrease under a low outdoor temperature condition, and a technology of carrying out heating with not decreasing driving distance of the electric vehicle or increasing the driving distance of the electric vehicle.

9 Claims, 9 Drawing Sheets

(51) Int. Cl.
*H01M 10/615* (2014.01)
*H01M 10/625* (2014.01)

(52) U.S. Cl.
CPC ....... *H01M 10/615* (2015.04); *H01M 10/625* (2015.04); *B60H 1/00392* (2013.01); *B60H 2001/00307* (2013.01)

(58) Field of Classification Search
USPC .............................................. 237/12.3 C, 19
See application file for complete search history.

(56) References Cited

U.S. PATENT DOCUMENTS

| | | | | |
|---|---|---|---|---|
| 4,291,649 | A * | 9/1981 | Boder | F22B 7/12 122/136 R |
| 4,936,505 | A * | 6/1990 | Hall | B60H 1/2212 122/20 B |
| 5,025,985 | A * | 6/1991 | Enander | B60H 1/00364 237/12.3 B |
| 5,205,250 | A * | 4/1993 | Easterly | F04N 19/04 123/142.5 R |
| 5,407,130 | A * | 4/1995 | Uyeki | B60H 1/00492 165/42 |
| 5,624,003 | A * | 4/1997 | Matsuki | B60H 1/00278 180/65.1 |
| 5,669,555 | A * | 9/1997 | Mosig | B60H 1/00521 126/312 |
| 6,769,623 | B2 * | 8/2004 | Ban | B60H 1/00492 237/12.3 B |
| 6,928,973 | B2 * | 8/2005 | Suzuki | F01N 3/2033 123/142.5 R |
| 7,501,793 | B2 * | 3/2009 | Kadouchi | H01M 2/1072 320/107 |
| 7,823,799 | B2 * | 11/2010 | Sakai | F24D 11/0214 237/19 |
| 8,118,239 | B2 * | 2/2012 | Robinson | F24H 1/287 122/13.01 |
| 9,038,400 | B2 * | 5/2015 | Goenka | B60H 1/00478 62/3.61 |
| 2005/0242782 | A1 * | 11/2005 | Kadouchi | H01M 2/1072 320/150 |
| 2010/0100306 | A1 * | 4/2010 | Gamache | F02N 11/0803 701/113 |
| 2011/0174000 | A1 * | 7/2011 | Richter | B60H 1/00064 62/93 |
| 2012/0205088 | A1 * | 8/2012 | Morisita | B60H 1/00921 165/202 |
| 2014/0144160 | A1 * | 5/2014 | Jackson | H01M 10/625 62/62 |
| 2014/0144998 | A1 * | 5/2014 | Ichishi | B60H 1/00314 237/12.3 A |
| 2015/0165871 | A1 * | 6/2015 | Miller | B60H 1/032 237/28 |

FOREIGN PATENT DOCUMENTS

| | | | |
|---|---|---|---|
| JP | H-06-231807 A | | 8/1994 |
| JP | 07329544 A | * | 12/1995 |
| JP | 08022845 A | * | 1/1996 |
| JP | 2013163412 A | * | 8/2013 |
| KR | 20100092631 A | * | 8/2010 |
| KR | 2011-0034705 A | | 4/2011 |
| KR | 2011-0060030 A | | 6/2011 |

OTHER PUBLICATIONS

Akasaka et al, JPH0822845A English machine translation, Jan. 23, 1996 (Year: 1996).*

* cited by examiner

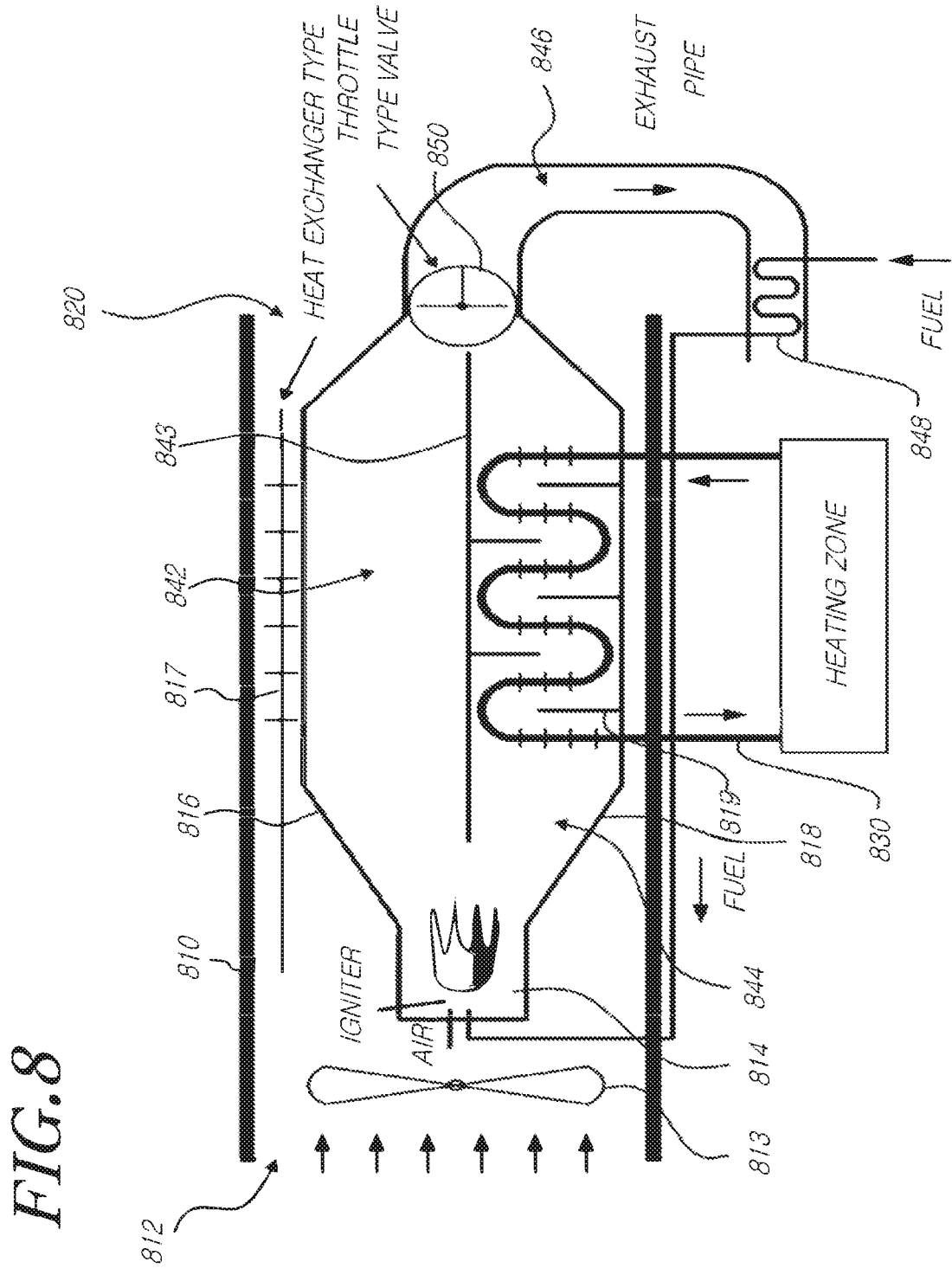

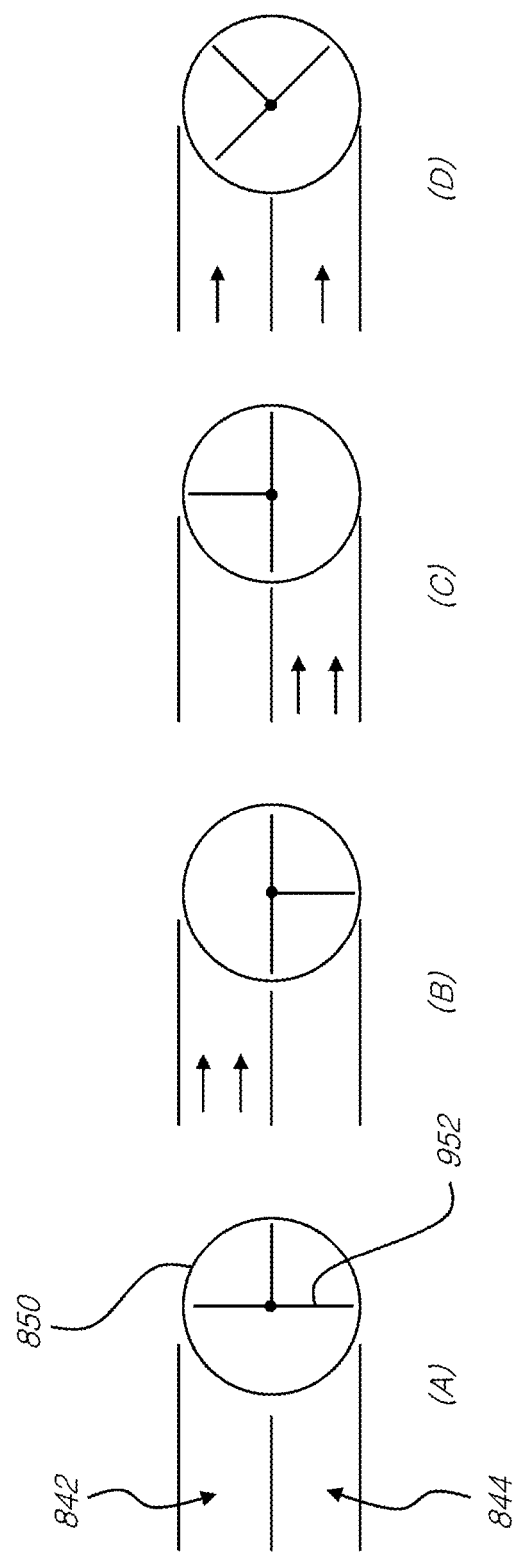

HYBRID TYPE HEATING SYSTEM CAPABLE OF SUPPLYING HEAT AND HOT WATER

CROSS-REFERENCE TO RELATED APPLICATIONS

This application claims priority from Korean Patent Application Nos. 10-2015-0095844 filed on Jul. 6, 2015 and 10-2015-0178111 filed on Dec. 14, 2015 which are hereby incorporated by reference for all purposes as if fully set forth herein.

BACKGROUND OF THE INVENTION

Field of the Invention

The present invention relates to a hybrid type heating system capable of heating air and water together.

Description of the Related Art

Compared to an internal combustion engine vehicle, a short per-charge range is a disadvantage to an electric vehicle. This is caused by a limitation on a capacity of a mounted battery.

In particular, as a battery power has to be shared with an air conditioning system in a winter heating season, a capacity of a battery to be used for driving decreases further. Accordingly, the per-charge range in the winter heating season decreases further. Specifically, when the air conditioning system is operated under an outdoor temperature of 0 degree in the winter heating season, it is known that the per-charge range decreases to 65% degree.

A battery has different capacities depending on an operation temperature so that battery capacity decreases under a low ambient temperature such as a winter. Thus, the per-charge range decreases further. Specifically, the battery capacity decreases to 75% degree under the ambient temperature 0 degree and the battery capacity may decrease to 50% degree under the ambient temperature of minus 25 degrees.

On the other hand, a conventional electric vehicle employs a positive temperature coefficient (PTC) heater in an air conditioning system for a heating. Such PTC heater has a problem that much power of 5.6 kW is consumed so that the battery capacity needed for driving is greatly decreased as described above. This PTC has also a problem that efficiency is low under a low temperature environment such as temperature of minus 10 degrees.

To solve these problems, it is necessary to develop a technology of carrying out heating without using a battery in an electric vehicle. It is also necessary to develop a technology of heating a battery so that battery capacity does not decrease under a condition of a low ambient air temperature.

To carry out indoor heating and battery heating together, it is necessary to heat air and to heat cooling water together. Therefore, it is necessary to develop a hybrid type heating system capable of heating air and water (cooling water) together.

On the other hand, the hybrid type heating system capable of heating the air and the water together is required by not only the electric vehicle but also the other technical fields.

For example, in an outdoor camping, there are some requirements to use indoor heating and hot water together, the hybrid type heating system capable of heating the air and the water together is needed to satisfy the requirements.

SUMMARY OF THE INVENTION

The present invention is made in consideration of the above-mentioned circumstances, and an object of an aspect thereof is to provide a hybrid type heating technology capable of heating air and water together.

Specifically, the present invention is to provide a technology of carrying out heating not using a battery in an electric vehicle and a technology of heating a battery so that performance of the battery does not decrease under a condition of a low outdoor temperature. The present invention is also to provide a technology of carrying out heating with not decreasing driving distance of the electric vehicle or increasing the driving distance of the electric vehicle.

The present invention is provide a technology of supplying air heating and hot water together to a temporary living space installed in an outside.

In order to achieve the above-mentioned objects, an aspect of the present invention is to provide an electric vehicle heating system comprising an intake port in which an air is injected into a cylinder; a burner of which an exterior surface is in contact with the air in the cylinder and which combusts fuel to generate combustion heat; a first heat exchanger which heats the air in the cylinder by using combustion heat supplied through a first channel pipe; a second heat exchanger which heats heating water by using combustion heat supplied through a second channel pipe; a flow controller of which a first side is connected to the first channel pipe, of which a second side is connected to the second channel pipe, of which a third side is connected to an exhaust port, and which regulates an amount of combustion heat flowing through each of the first channel pipe and the second channel pipe; a heating port which emits heated air into an indoor area; and a pump which circulates the heating water around a battery.

In the electric vehicle heating system, exterior surfaces of the first heat exchanger and the second heat exchanger are in contact with the air in the cylinder to heat the air.

The electric vehicle heating system comprises further an exhaust port which is connected to the first channel pipe and the second channel pipe, and the exhaust port is connected to the outside of the electric vehicle. The electric vehicle heating system comprises further a third heat exchanger which heats the fuel by using combustion heat remaining in the exhaust port, and the third heat exchanger is positioned at the outside of the cylinder.

Fuel which is used in the electric vehicle is butane or propane.

The combustion heat being generated in the burner is transmitted to the first channel pipe and the second channel pipe with exhaust gas of the burner.

Another aspect of the present invention is to provide a method of controlling an electric vehicle heating system comprising generating combustion heat by combusting fuel; heating indoor air by using heat of a first channel pipe; heating battery heating water by using heat of a second channel pipe; and controlling distribution of the combustion heat into the first channel pipe and the second channel pipe.

In the method of controlling the electric vehicle heating system, in the controlling step, the electric vehicle heating system recognizes an operation signal of a driver and controls the distribution of the combustion heat according to the operation signal.

In the controlling step, the electric vehicle heating system controls an amount of the combustion heat supplied to the first channel pipe according to a set condition of indoor temperature, and controls an amount of the combustion heat supplied to the second channel pipe so that the amount decreases according to elapse time after start.

Still another aspect of the present invention is to provide an indoor heating system comprising an intake port in which an air is injected into a cylinder; a burner of which an exterior surface is in contact with the air in the cylinder and which combusts fuel to generate combustion gas having high temperature; a first heat exchanger which heats the air in the cylinder by using heat of the combustion gas supplied through a first channel pipe; a second heat exchanger which heats heating water by using the heat of the combustion gas supplied through a second channel pipe; an exhaust port which emits the combustion gas through a third channel pipe to an outside; a flow controller of which a first side is connected to the first channel pipe, of which a second side is connected to the second channel pipe, of which a third side is connected to an exhaust port, and which regulates an amount of the combustion gas flowing through each of the first channel pipe and the second channel pipe; a heating port which emits the air in the cylinder into an indoor area; and a pump which circulates the heating water around an indoor hot water pipe.

As described above, according to the present invention, it is possible to heat air and water together. Specifically, according to the present invention, it is possible to heat an electric vehicle without using a battery and to heat the battery so that the battery performance does not decrease under a condition of a low ambient temperature. According to the present invention, it is possible to carry out heating with not decreasing driving distance of the electric vehicle or increasing the driving distance of the electric vehicle. According to the present invention, it is possible to supply air heating and hot water together to a temporary living space installed in the outside.

BRIEF DESCRIPTION OF THE DRAWINGS

The above and other aspects, features and other advantages of the present invention will be more clearly understood from the following detailed description taken in conjunction with the accompanying drawings, in which:

FIG. 8 is a diagram specifically illustrating a configuration to be arranged in an indoor area in the second embodiment; and FIG. 9 is a diagram illustrating flow rates of a first channel pipe and a second channel pipe to be controlled by a flow controller.

DETAILED DESCRIPTION OF THE PREFERRED EMBODIMENT

Figure 1:
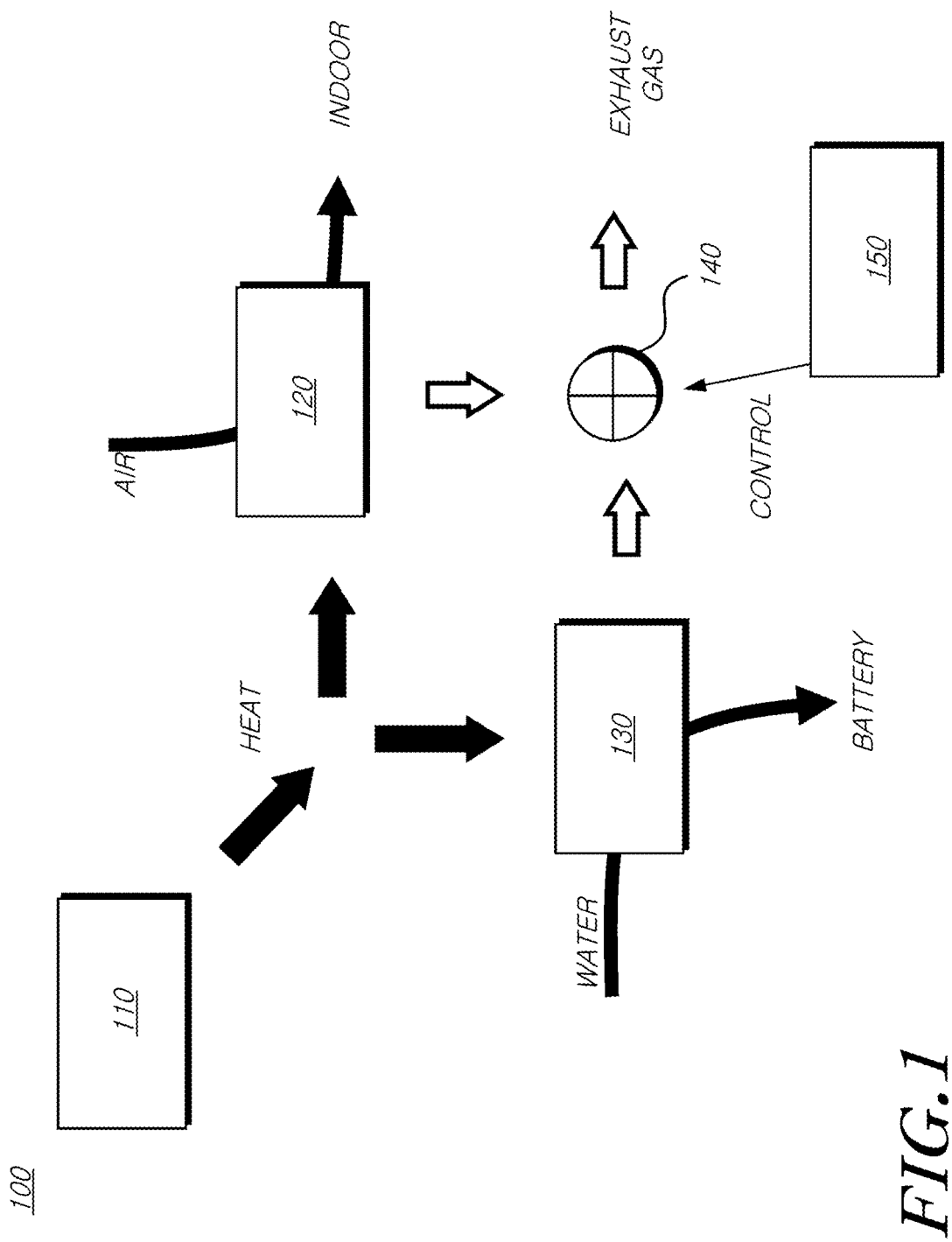
FIG. 1 is a diagram illustrating a schematic configuration of an electric vehicle heating system according to a first embodiment.

Hereinafter, some embodiments of the present invention will be described in detail with reference to the accompanying drawings. In describing the invention with reference to the accompanying drawings, like elements are referenced by like reference numerals or signs regardless of the drawing numbers. When it is determined that detailed description of known techniques involved in the invention makes the gist of the invention obscure, the detailed description thereof will not be made.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element is "interposed" therebetween or the elements may be "coupled" or "connected" to each other with still another element interposed therebetween.

[First Embodiment]

Hereinafter, a hybrid type electric vehicle heating system according to a first embodiment will be described. In a viewpoint of carrying out indoor heating and battery heating together by heating air and cooling water, the present invention is titled the hybrid type electric vehicle heating system, but is not limited thereto.

Hereinafter, the term "hybrid type" will be omitted for the convenience of description.

FIG. 1 is a diagram illustrating a schematic configuration of an electric vehicle heating system 100 (hereinafter, referred to as a heating system) according to a first embodiment.

Referring to FIG. 1, the heating system 100 includes a burner 110, a first heat exchanger 120, a second heat exchanger 130, a heat distribution unit 140, and a controller 150.

The burner 110 combusts fuel to generate combustion heat.

The combustion heat generated in the burner 110 is transmitted to the first heat exchanger 120 and the second heat exchanger 130.

The first heat exchanger 120 heats indoor air of an electric vehicle by using the combustion heat to be transmitted.

The second heat exchanger 130 heats battery heating water by using the combustion heat to be transmitted. Here, the battery heating water is liquid circulating around a battery pack to increase temperature of the battery. But, the battery heating water is not only used for this purpose but also used for decreasing the temperature of the battery. In view of the latter, the battery heating water may be named cooling water.

The combustion heat transmitted to the first heat exchanger 120 and the second heat exchanger 130 is emitted to the outside via the heat distribution unit 140.

The controller 150 controls the heat distribution unit 140 to control the amount of heat transmitted from the burner 110 to the first heat exchanger 120 and the amount heat transmitted from the burner 110 to the second heat exchanger 130. Besides, the controller 150 carries out various controls needed to operate the heating system 100. For example, the controller 150 controls the burner 110 to control the generation amount of the combustion heat.

Meanwhile, the heat distribution unit 140 is a flow control valve. Here, the combustion heat generated from the burner 110 is transmitted in the shape of a fluid (for example, an exhaust gas)

Figure 2:
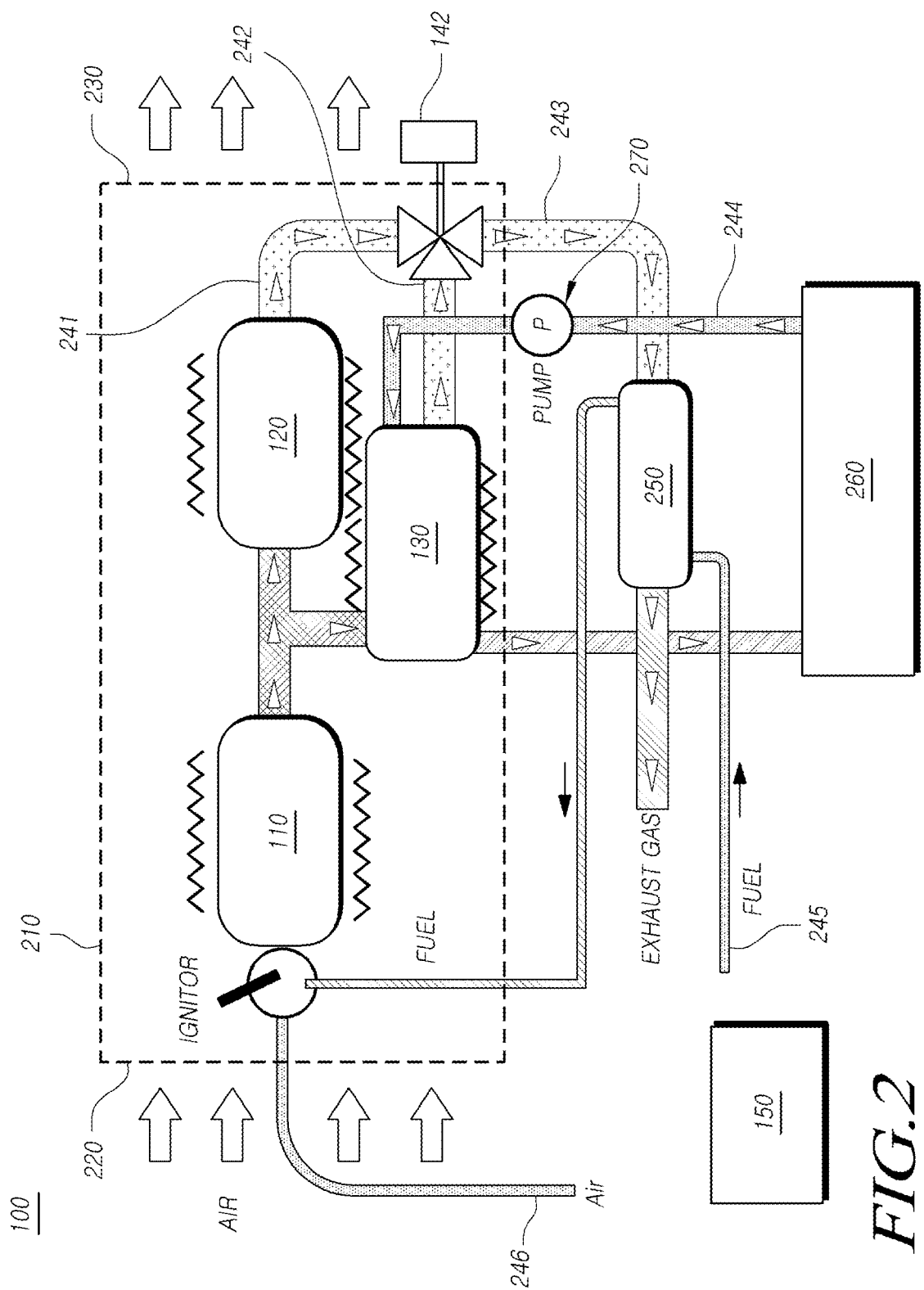
FIG. 2 is a diagram illustrating a schematic arrangement of the electric vehicle heating system according to the first embodiment.

FIG. 2 is a diagram illustrating a schematic arrangement of the electric vehicle heating system according to the first embodiment.

Referring to FIG. 2, a cylinder 210 is arranged in the heating system 100, and the burner 110, the first heat exchanger 120, and the second heat exchanger 130 are arranged in the cylinder 210. In the cylinder 210, an intake port 220 by which air is inhaled and a heating port 230 by which heated air is emitted are arranged.

The intake port 220 inhales the air from the outside of the cylinder 210 and the heating port 230 emits the air heated in the cylinder 210 into the inside of the electric vehicle. Here, in at least one of the intake port 220 and the heating port 230, a ventilator is further included. Such ventilator is controlled by the controller 150. As an example, the controller 150 controls the ventilation amount of the ventilator according to combustion heat transmitted with the air by the first heat exchanger 120. Otherwise, the controller 150 recognizes an operation signal of a driver and controls the ventilation amount of the ventilator according to the operation signal.

The burner 110 is arranged in a direction close to the intake port 220, and heats air inhaled via an exterior surface by the intake port 220. In another aspect, the exterior surface of the burner 110 is arranged to be in contact with the air in the cylinder 210 so that the air can be heated by using the combustion heat to be emitted from the exterior surface.

A fuel pipe 245 is connected to the burner 110, and an igniter which ignites fuel to be injected through the fuel pipe 245 is further included.

An oxygen supply pipe 246 is connected to the burner 110, and oxygen is supplied through the oxygen supply pipe 246. Air is supplied through the oxygen supply pipe 246 as it is, and oxygen in the air is used in a combustion process.

Butane or propane having low carbon emissions is used as the fuel. The butane or propane flows through the fuel pipe 245 in a liquid state, and then is vaporized in the burner 110 to be used in the combustion process.

The combustion heat generated in the burner 110 is transmitted to the first heat exchanger 120 and the second heat exchanger 130 according to control of a three way valve 142 used as an example of a flow control valve. Here, the combustion heat is transmitted to the first heat exchanger 120 and the second heat exchanger 130 in a state of exhaust gas (carbon dioxide, vapor, and the like) which results from combustion and stores the combustion heat.

The exhaust gas generated in the burner 110 is emitted through a first channel pipe 241 and/or a second channel pipe 242.

Here, the amount of the combustion heat supplied to the first channel pipe 241 and the amount of the combustion heat supplied to the second channel pipe 242 are decided by the three way valve 142. The three way valve 142 selects one of the first channel pipe 241 and the second channel pipe 242 to transfer the combustion heat (for example, combustion heat contained in the exhaust gas). The three way valve 142 is controlled according to control signals of the controller 150

The first heat exchanger 120 is arranged on the first channel pipe 241 and absorbs the combustion heat from the exhaust gas flowing through the first channel pipe 241 to heat the air in the cylinder 210. For this purpose, the first heat exchanger 120 includes an exterior surface being in contact with the air in the cylinder 210, and the exterior surface has a large surface area so that heat emission can be facilitated.

The second heat exchanger 130 is arranged on the second channel pipe 242 and absorbs the combustion heat from the exhaust gas flowing through the second channel pipe 242 to heat the battery heating water.

The battery heating water flows through a battery hot water pipe 244 and the battery hot water pipe 244 and the second channel pipe 242 are coupled in the second heat exchanger so that the combustion heat of the exhaust gas can be transmitted to the battery heating water. Here, an exterior surface of the second heat exchanger 130 is in contact with the air in the cylinder 210 so that a portion of the combustion heat can be used to heat the air.

The battery hot water pipe 244 includes further a circulation pump 270. The circulation pump 270 helps the battery heating water to circulate through the battery hot water pipe 244.

The circulation pump 270 is controlled by the controller 150, and the controller 150 controls differently the circulation pump 270 according to the amount of the combustion heat transmitted to the second heat exchanger 130. For example, when the combustion heat transmitted to the second heat exchanger 130 is zero, the controller 150 does not operate the circulation pump 270. Another example, the controller 150 recognizes the operation signal of the driver and controls the operation amount of the circulation pump 270 according to the operation signal. That is, when the electric vehicle is on the start state, the operation amount of the circulation pump 270 can be increased.

The battery heating water transmits the combustion heat to a battery package 260 through the battery hot water pipe 244. The battery package 260 includes a battery, electronic circuits controlling the battery, and the like, and includes further packing material enclosing the battery and the electronic circuits. The battery heating water is directly in contact with a surface of the battery to control temperature of the battery, but is also in contact with the packing material of the battery to indirectly transmit heat to the battery.

The battery package 260 includes further a temperature sensor, and the controller 150 measures the temperature of the battery by the temperature sensor. The controller 150 uses the measurement value of the temperature of the battery to control the amount of the combustion heat transmitted to the second heat exchanger 130 or to control the operation amount of the circulation pump 270. Otherwise, the controller 150 controls the amount of the combustion heat to be generated in the burner 110.

The first channel pipe 241 and the second channel pipe 242 are connected to an exhaust port 243 via the three way valve 142, and the exhaust port 243 is connected to the outside of the electric vehicle.

The exhaust port 243 passes through the outside of the cylinder 210 and then is connected to the outside of the electric vehicle. The circulation pump 270 and the battery package 260 are also arranged in the outside of the cylinder 210.

The heating system 100 includes further a third heat exchanger 250, and the third heat exchanger 250 is arranged on the exhaust port 243.

The exhaust port 243 and the fuel pipe 245 are coupled in the third heat exchanger 250, and thus the third heat exchanger 250 heats the fuel by using the combustion heat remaining in the exhaust port 243.

Figure 3:
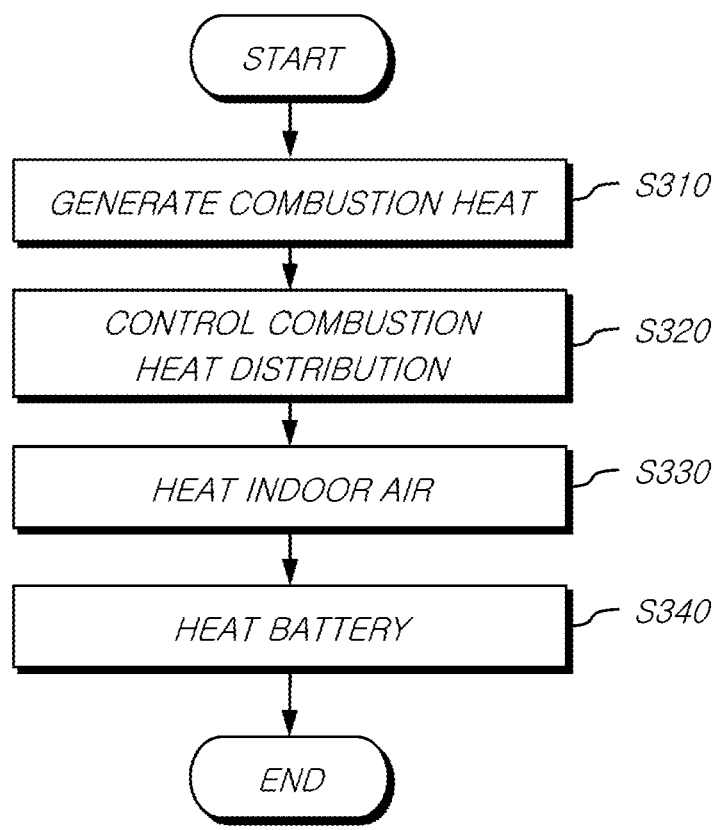
FIG. 3 is a flowchart illustrating a method of controlling the electric vehicle heating system according to the first embodiment.

FIG. 3 is a flowchart illustrating a method of controlling the electric vehicle heating system according to the first embodiment.

Referring to FIG. 3, the heating system generates the combustion heat (S310). At this time, the amount of the combustion heat to be generated is determined by the operation signal of the driver or a control process of the controller 150.

For example, the heating system 100 recognizes the operation signal (for example, pressure signal of each level button) of the driver to determine the amount of the combustion heat. When a touch screen is provided in the electric vehicle, the heating system 100 displays levels corresponding to the amount of the combustion heat on the touch screen, and receives a touch input for a specific level by the driver, and then generates the combustion heat having an amount corresponding to the specific level.

Here, the heating system 100 controls the amount of the fuel injected to the burner 110 to control the amount of the combustion heat.

After generation of the combustion heat, the heating system 100 distributes the combustion heat into the first heat exchanger 120 and the second heat exchanger 130 (S320).

At this time, the heating system 100 recognizes the operation signal of the driver and controls the distribution of the combustion heat according to the operation signal. The heating system 100 recognizes various condition variable values (for example, battery temperature, indoor temperature, and the like) measured in the electric vehicle, and controls the distribution of the combustion heat according to the condition variable values.

When the combustion heat is distributed into the first heat exchanger 120 and the second heat exchanger 130, the first heat exchanger 120 heats indoor air by using the combustion heat (S330) and the second heat exchanger 130 heats the battery by using the combustion heat (S340).

Figure 4:
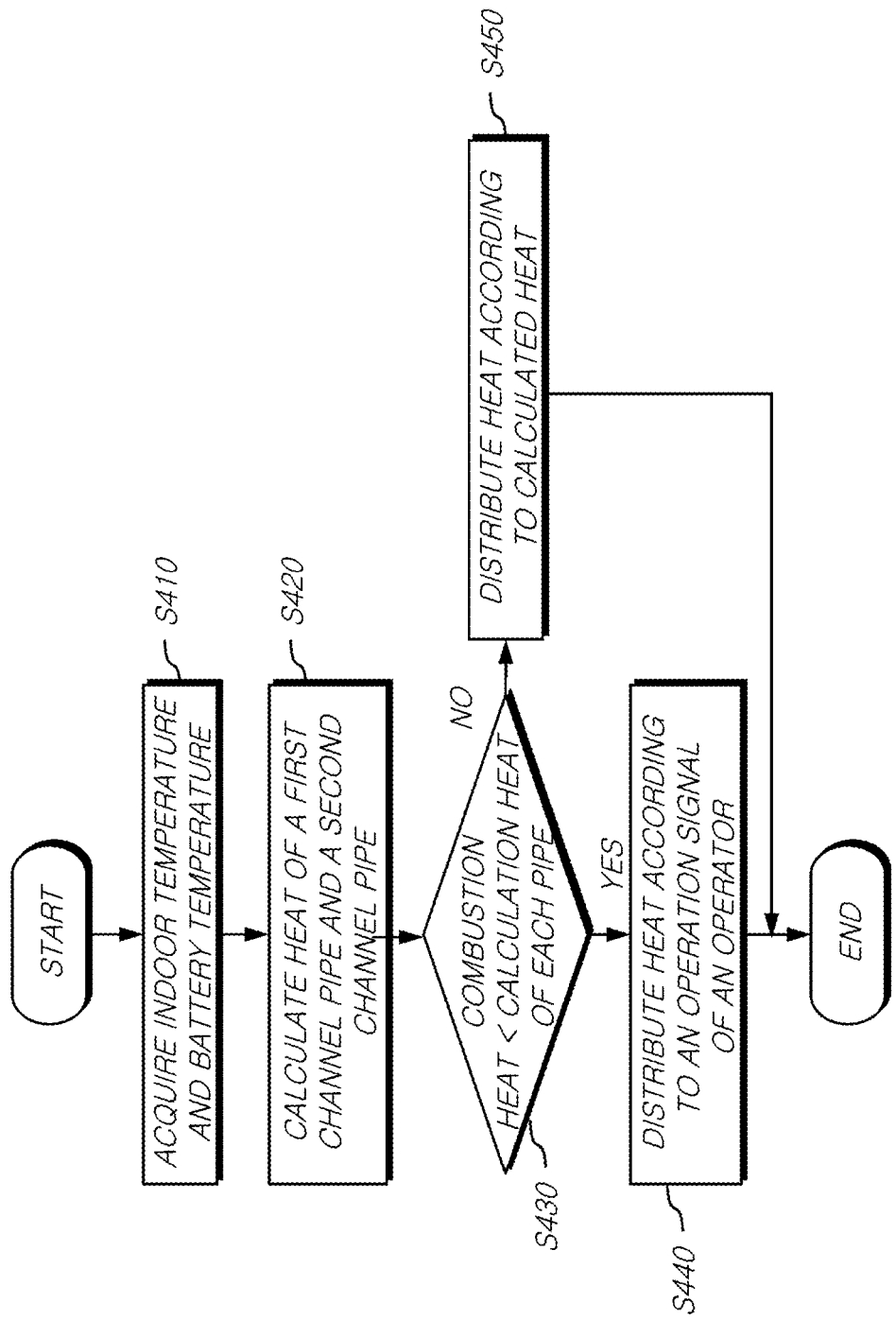
FIG. 4 is a diagram illustrating a first example of distributing combustion heat in the controlling method according to the first embodiment.

FIG. 4 is a diagram illustrating a first example of distributing combustion heat in the controlling method according to the first embodiment.

Referring to FIG. 4, in the step of distributing the combustion heat (S320), the heating system 100 acquires the condition variable values of the electric vehicle in advance (S410). Here, the heating system 100 acquires an indoor temperature value and a battery temperature value based on the condition variable values.

The heating system 100 calculates the amount of the combustion heat to be supplied to the first channel pipe 241 and the second channel pipe 242 by using the condition variable values. In another aspect, the heating system 100 calculates the amount of the combustion heat to be supplied to the first heat exchanger 120 and the second heat exchanger 130 by using the condition variable values.

For example, the heating system 100, in step S410, acquires an indoor temperature measurement value and an indoor temperature set value based on the condition variable values, and calculates a value proportional to a difference between the indoor temperature measurement value and the indoor temperature set value as the amount of the combustion heat to be supplied to the first channel pipe 241. Another example, the heating system 100, in step S410, acquires the battery temperature measurement value based on the condition variable values, and calculates a value proportional to a difference between the battery temperature set value stored in an inside memory and the battery temperature measurement value as the amount of the combustion heat to be supplied to the second channel pipe 242.

The heating system 100 compares the amount of the combustion heat to be supplied to each pipe and the amount of the combustion heat generated in the burner 110 or calculated to be generated in the burner 110 (S430).

When the amount of the combustion heat generated in the burner 110 is smaller than the amount of the combustion heat to be supplied to each pipe in the comparison step (YES in step S430), the heating system 100 controls the distribution of the combustion heat according to the operation signal of the driver (S440).

For example, when the driver chooses an indoor heating mode or chooses a condition that indoor heating has priority over battery heating, the heating system 100 supplies the combustion heat generated in the burner 110 to the first heat exchanger 120 preferentially.

When the amount of the combustion heat generated in the burner 110 is equal to or greater than the amount of the combustion heat to be supplied to each pipe in the comparison step (NO in step S430), the heating system 100 supplies necessary combustion heat to each pipe. At this time, the combustion heat may be left over, and when the battery in not overheated, the heating system 100 supplies leftover combustion heat to the second heat exchanger 130.

Figure 5:
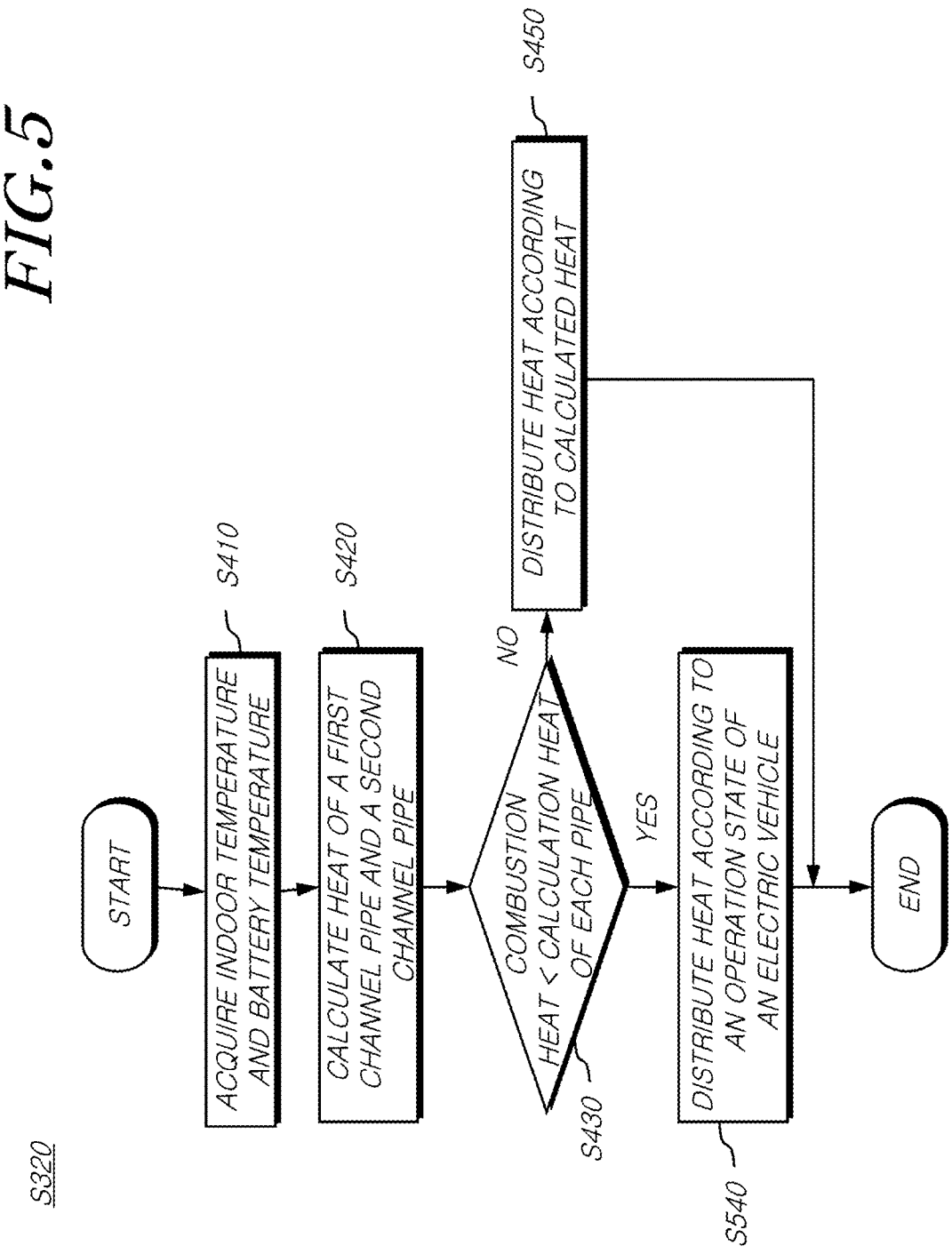
FIG. 5 is a diagram illustrating a second example of the step of distributing combustion heat in the controlling method according to the first embodiment.

FIG. 5 is a diagram illustrating a second example of the step of distributing combustion heat in the controlling method according to the first embodiment.

Referring to FIG. 5, in the step of distributing the combustion heat (S320), the heating system 100 acquires the condition variable values of the electric vehicle in advance (S410). Here, the heating system 100 acquires an indoor temperature value and a battery temperature value based on the condition variable values.

The heating system 100 calculates the amount of the combustion heat to be supplied to the first channel pipe 241 and the second channel pipe 242 by using the condition variable values. In another aspect, the heating system 100 calculates the amount of the combustion heat to be supplied to the first heat exchanger 120 and the second heat exchanger 130 by using the condition variable values.

For example, the heating system 100, in step S410, acquires an indoor temperature measurement value and an indoor temperature set value based on the condition variable values, and calculates a value proportional to a difference between the indoor temperature measurement value and the indoor temperature set value as the amount of the combustion heat to be supplied to the first channel pipe 241. Another example, the heating system 100, in step S410, acquires the battery temperature measurement value based on the condition variable values, and calculates a value proportional to a difference between the battery temperature set value stored in an inside memory and the battery temperature measurement value as the amount of the combustion heat to be supplied to the second channel pipe 242.

The heating system 100 compares the amount of the combustion heat to be supplied to each pipe and the amount of the combustion heat generated in the burner 110 or calculated to be generated in the burner 110 (S430).

When the amount of the combustion heat generated in the burner 110 is smaller than the amount of the combustion heat to be supplied to each pipe in the comparison step (YES in step S430), the heating system 100 controls the distribution of the combustion heat according to an operation state of the electric vehicle (S540).

The operation state of the electric vehicle is classified according to time after start. For example, a state ranging from the start to a first time is defined as a start state, a state ranging from the first time to a second time is defined as a first driving state, and a state after the second time is defined as a second driving state. When the operation state of the electric vehicle is classified according to the time after the start as described above, the heating system 100 maximizes the amount of the combustion heat supplied to the second heat exchanger 130 in the start state, and then decreases the amount of the combustion heat supplied to the second heat exchanger 130 in the first driving state and the second driving state.

On the other hand, the heating system 100, in step S540, controls distribution of the combustion heat according to the time after the start. For example, the heating system 100 controls the amount of the combustion heat supplied to the second channel pipe so that the amount decreases according to elapse time after the start. When some time elapses after the start, the heating system 100 blocks up the second channel pipe 242 and supplies the combustion heat through only the first channel pipe 241.

When the amount of the combustion heat generated in the burner 110 is equal to or greater than the amount of the combustion heat to be supplied to each pipe in the comparison step (NO in step S430), the heating system 100 supplies necessary combustion heat to each pipe. At this time, the combustion heat may be left over, and when the battery in not overheated, the heating system 100 supplies leftover combustion heat to the second heat exchanger 130.

The first embodiment has the effect of not decreasing battery capacity necessary for driving by carrying out heating without using the battery of in the electric vehicle. The first embodiment has also the effect of not decreasing battery performance under a condition of low environment temperature by heating the battery. The first embodiment has also effect of carrying out heating by not decreasing the driving distance of the electric vehicle or by increasing the driving distance of the electric vehicle.

Second Embodiment

Figure 6:
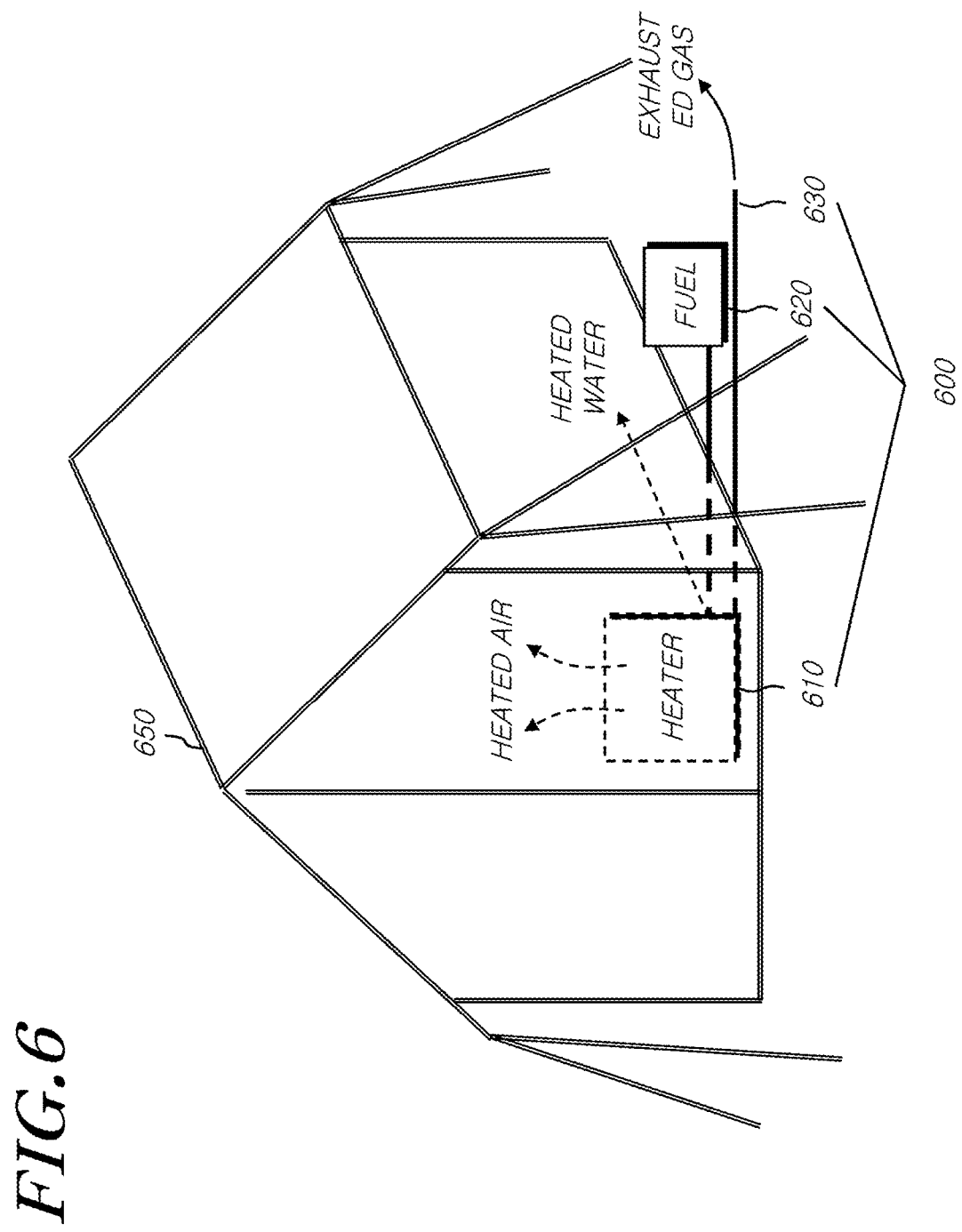
FIG. 6 is a diagram illustrating flows of heat and exhaust gas in a tent to which a heating system according to a second embodiment is applied.

FIG. 6 is a diagram illustrating flows of heat and exhaust gas in a tent to which a heating system according to a second embodiment is applied.

Referring to FIG. 6, a heating system 600 provides heated air and heated heating water to a tent 650 furnished in the outdoor field.

The heating system 600 includes a heater 610, a fuel tank 620, and an exhaust port 630, and the heater 610 is positioned in the inside of the tent 650, and the fuel tank 620 and the exhaust port 630 are positioned in the outside of the ten In the heating system 600, as the fuel tank 620 is positioned in the outside of the tent 650, a risk of an explosion due to fuel leakage or fuel overheat becomes to be decreased.

In the heating system 600, as the exhaust port 630 is positioned in the outside of the tent 650, a risk of suffocation caused by indoor emission of the exhaust gas becomes to be decreased.

The heating system 600 provides not only the heated air but also the heated heating water, and thus user operates the heating system 600 with air heating at the center or operates the heating system 600 with floor heating at the center.

Figure 7:
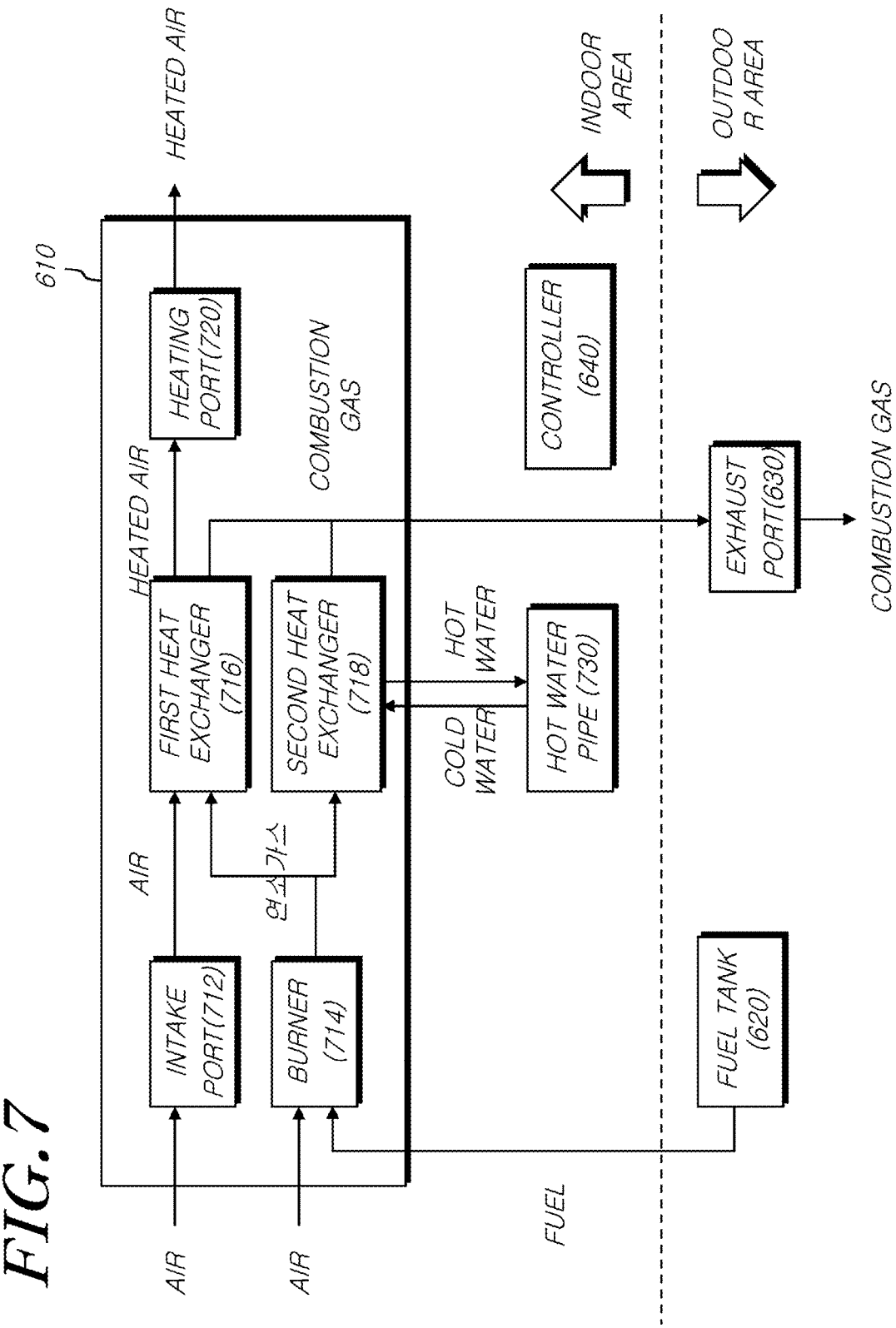
FIG. 7 is a block diagram illustrating a schematic configuration of the heating system according to the second embodiment.

FIG. 7 is a block diagram illustrating a schematic configuration of the heating system according to the second embodiment.

A configuration of the heating system 600 is classified into an indoor area and an outdoor area.

The heater 610 and a hot water pipe 730 are arranged in the indoor area. In the heater 610, an intake port 712, a burner 714, a first heat exchanger 716, a second heat exchanger 718, and a heating port 720 are arranged.

The fuel tank 620 and the exhaust port 630 are arranged in the outdoor area.

The heater 610 is supplied with air, fuel, and cool water, and then produces the heated air and the hot water, and emits exhaust gas. Gas caused by fuel combustion is called combustion gas, and thus combustion gas may be also called exhaust gas in view that the gas is emitted to the outside of the tent 650. Hereinafter, it will be described by using the term "combustion gas".

The intake port 712 inhales air into the inside of the heater 610. The inhaled air passes the first heat exchanger 716 and then is converted into the heated air.

A portion of the air inhaled by the intake port 712 is transmitted to the burner 714. But, air supplied to the burner 714 is supplied via the other path.

The intake port 712 includes further another device for inhaling the air, such as a fan. The another device performs functions of inhaling the air existing in the outside of the heater 610 into the inside of the heater 610.

The burner 714 generates combustion gas and combustion heat by combusting the fuel. Here, the combustion heat is transmitted in the form of radiation, but is also transmitted in the form of the combustion gas. For example, high temperature combustion gas is caused by fuel combustion, and the combustion heat is transmitted in the form of heat energy that the high temperature combustion gas contains In order to combust the fuel, air and fuel is supplied to the burner 714. As described above, the air is supplied by the intake port 712 or by a separate pipe.

The fuel is supplied from the fuel tank 620 positioned in the outdoor area. Low carbon fuel such as butane or propane classified into liquefied fuel is used as the fuel. The fuel supplied from the fuel tank 620 may be liquid fuel such as kerosene besides the liquefied fuel.

The burner 714 includes further an igniter and combusts the fuel by using the igniter.

The combustion gas generated by the burner 714 is transmitted to the first heat exchanger 716 and the heat exchanger 718.

The first heat exchanger 716 heats the air supplied to the first heat exchanger 716 by using the combustion heat contained in the combustion gas. This heat air is supplied to the inside of the tent 650 through the heating port 720.

As the combustion gas does not mixed with indoor air in this air heating process and only the combustion heat is transmitted to the indoor air by the heat exchanger, a problem of indoor air contamination does not occur. The indoor air is continuously circulated with no ventilation, and thus heat efficiency can be improved.

The second heat exchanger 718 heats the heating water by using the combustion heat contained in the combustion gas.

The heating water is supplied by the hot water pipe 730. When the hot water pipe 730 is arranged for the floor heating, the heating water in the hot water pipe 730 is continuously circulated with no outside discharging and is transmitted to the second heat exchanger 718. On the other hand, when the hot water pipe 730 is used for temporary hot water supply such as washing or cleaning, cooling water is continuously supplied to the hot water pipe 730 and this cooling water is transmitted to the second heat exchanger 718.

The heating water supplied by the hot water pipe 730 is heated by the combustion heat in the combustion gas transmitted to the second heat exchanger 718. The heated hot water is supplied again by the hot water pipe 730 and is used for the floor heating, washing water, or the like.

The combustion gas transmitting heat to another member (indoor air or heating water) by heat exchange in the first heat exchanger 716 and the second heat exchanger 718 is finally emitted through the exhaust port 630 positioned in the outdoor area.

Meanwhile, the heating system 600 includes further a controller 640. The controller 640 electrically operates the heating system 600. For this operation, the heating system 600 includes further separate devices.

For example, throttle valve regulated according to electric signals is positioned between the fuel tank 620 and the burner 714. The controller 640 controls the amount of the fuel combusted in the burner 714 by electrically regulating the throttle valve.

A fan is positioned in the intake port 712, and the controller 640 regulates the rotation speed of the fan to control the amount of the air supplied into the inside of the heater 610.

The hot water pipe 730 includes a circulation pump, and the controller 640 controls the circulation pump to regulate circulation speed of the hot water.

A fan is also positioned in the heating port 720, and the controller 640 controls rotation speed of the fan positioned in the heating port 720 to regulate the amount of the air supplied to the inside of the tent 650. The fan positioned in the heating port 720 is also used for determining the circulation speed of the indoor air of the tent 650.

The fan is also positioned in the exhaust port 630, and the controller 640 controls the rotation speed of the fan positioned in the exhaust port 630 to control discharging speed of the combustion gas.

The heating system 600 includes further a battery for electronic control. The controller 640 and the other electronic auxiliary equipment operate by being supplied with electric energy from the battery. The fuel tank or equipment related thereto is frozen due to low outside temperature of a winter season, which causes an initial operation problem, and hot wire is arranged at parts having the problem. Electric energy supplied to the hot wire is supplied by the battery.

FIG. 8 is a diagram specifically illustrating a configuration to be arranged in an indoor area in the second embodiment.

Referring to FIG. 8, the heater 610 includes a cylinder 810. The cylinder 810 provides a path in which the indoor air is heated.

An intake port 812 injects air into the cylinder 810. The intake port 812 includes an intake fan 813 to inject the air. The amount of the air injected into the cylinder 810 is determined according to rotation speed of the intake fan 813. The intake fan 813 performs a function of passing the air in a single direction from the intake port 812 to a heating port 820.

A burner 814, a first heat exchanger 816, and a second heat exchanger 818 forming the heater 610 are arranged in the cylinder 810.

In the burner 814, an exterior surface of the burner 814 is in contact with the air in the cylinder 810, and fuel is combusted to generate high temperature combustion gas in the inside.

Combustion heat generated in the burner 814 is primarily transmitted to the air in the cylinder 810 through the exterior surface of the burner 814. Leftover combustion heat not transmitted through the exterior surface flows with the combustion gas to a first channel pipe 842 and a second channel pipe 844 connected to the burner 814.

The first channel pipe 842 is a pipe of transmitting the combustion gas and the combustion heat generated in the burner 814 to a first heat exchanger 816. The first heat exchanger 816 heats the air in the cylinder 810 by using the combustion heat of the combustion gas supplied through the first channel pipe 842.

In order to improve efficiency of heat exchange, the first heat exchanger 816 includes further a heat exchanger 817. Heat transmission is directly proportional to surface area and is inversely proportional to thickness so that the heat exchanger 317 means a structure having multi surfaces and thin thickness. The heat exchanger 817 is made up of materials having high thermal conductivity and conventionally is made up of metal having high thermal conductivity.

The heat exchanger 817 is attached to an exterior surface of the first heat exchanger 816. According to this configuration, the heat exchanger 817 is supplied with the combustion heat of the combustion gas via a side surface and again transmits the supplied heat to the air via multi side surfaces.

The second channel pipe 844 is a pipe of transmitting the combustion gas and the combustion heat generated in the burner 814 to a second heat exchanger 818. The second heat exchanger 818 heats heating water of a hot water pipe 830 by using the combustion heat of the combustion gas supplied through the second channel pipe 844.

In order to improve efficiency of heat exchange, the hot water pipe 830 is formed to extend to inside of the second channel pipe 844. The hot water pipe 830 has a shape of curves in the second channel pipe 844 to enlarge contact area with the combustion gas.

In the second channel pipe 844, partition walls 819 are formed to cross each other. The partition walls 819 are formed in a direction perpendicular to a supply direction in which the combustion gas is supplied in the second channel pipe 844, so that the partition walls 819 performs a function of slowing flow of the combustion gas in the second channel pipe 844 along the direction.

The partition walls 819 are formed to cross each other. For example, when a partition wall is formed at the top side, another partition wall is formed to be separated from the partition wall at the bottom side.

When the partition walls 819 are formed to cross each other, a curved path for the combustion gas is formed in the second channel pipe 844 and the hot water pipe 830 is arranged along the curved path.

The hot water pipe 830 has wide protrusions formed on the exterior surface thereof for much greater heat exchange.

A side of the first channel pipe 842 and a side of the second channel pipe 844 are in contact with each other.

The burner 814, the first channel pipe 842, and the second channel pipe 844 share their outside surfaces. In another aspect, the burner 814 and the first channel pipe 842 are formed in a unified shape in which no partition wall is formed between a space in which the fuel is combusted in the burner 814 and the first channel pipe 842. Similarly, there is no partition wall positioned between the burner 814 and the second channel pipe 844. Here, the first channel pipe 842 and the second channel pipe 844 are divided by a plate which they share with each other, such as an intermediate plate 843.

The heating system 600 includes further a flow controller which controls the amount of the combustion gas flowing through each of the first channel pipe 842 and the second channel pipe 844.

The flow controller is positioned among the burner 814, the first channel pipe 842, and the second channel pipe 844, or positioned at the latter parts of the first channel pipe 842 and the second channel pipe 844.

For example, when the flow controller is connected to three sides, the first side of the flow controller is connected to the burner 814, the second side thereof is connected to the first channel pipe 842, and the third side thereof is connected to the second channel pipe 844. Further, in the flow controller, the first side is connected to the first channel pipe 842, the second side is connected to the second channel pipe 844, and the third side is connected to a third pipe 846 through which the combustion gas is emitted to the outdoor area.

FIG. 8 illustrates an embodiment in which the flow controller is positioned at the latter parts of the first channel pipe 842 and the second channel pipe 844.

The flow controller is a three way valve 850. The three way valve 850 controls flow rate of the combustion gas flowing through the first channel pipe 842 and the second channel pipe 844. When the three way valve 850 increases the flow rate of the combustion gas flowing the first channel pipe 842, the flow rate of the combustion gas flowing through the second channel pipe 844 decreases. On the contrary, when the three way valve 850 decreases the flow rate of the combustion gas flowing the first channel pipe 842, the flow rate of the combustion gas flowing through the second channel pipe 844 increases.

FIG. 9 is a diagram illustrating flow rates of a first channel pipe and a second channel pipe to be controlled by a flow controller.

The flow controller is the three way valve 850, and the three way valve 850 includes a flow blocking plate 952 having a T-shaped cross section. Flow rates of the first channel pipe 842 and the second channel pipe 844 are differently controlled according to a rotation angle of the flow blocking plate 952.

Referring to FIG. 9A, the flow blocking plate 952 blocks all the combustion gasses flowing the first channel pipe 842 and the second channel pipe 844.

Referring to FIGS. 9B and 9C, the flow blocking plate 952 transmits only the combustion gas of the first channel pipe 842 or only the combustion gas of the second channel pipe 844 according to the rotation angle.

Referring to FIG. 9D, the flow blocking plate 952 controls flow rates of the combustion gas of the first channel pipe 842 and the second channel pipe 844 according to the rotation angle.

The rotation angle of the flow blocking plate 952 is manually controlled by the user, or electronically controlled by the controller 640 illustrated in FIG. 7. Here, the controller 640 stores flow rates of the first channel pipe 842 and the second channel pipe 844 according to the rotation angle or the combustion heat according to the flow rate in a memory in advance, and controls the rotation angle of the flow blocking plate 952 according to another control signal (for example, temperature control signal) of the user.

Referring to FIG. 8 again, the combustion gas passed the flow controller is emitted to the outdoor area through the third channel pipe 846.

Here, a third heat exchanger 848 is positioned in the third channel pipe 846. The third heat exchanger 848 heats fuel supplied from the fuel tank 620 by the burner 814 by using heat of the combustion gas supplied through the third channel pipe 846.

The fuel tank 620 supplies the fuel to the burner 814 through a fuel pipe, and the fuel pipe is formed in the third channel pipe 846. Here, the fuel pipe formed in the third channel pipe 846 is supplied with the combustion heat from the combustion gas transmitted through the third channel pipe 846. This portion becomes the third heat exchanger 848.

The third heat exchanger 848 is positioned in the indoor area or positioned in the outdoor area. In the outdoor area, as there is a case that it is necessary to heat the fuel in a position close to the fuel tank 620, the third heat exchanger 848 is positioned in the outdoor area.

Meanwhile, the heating system 600 is additionally equipped with a gas blocking device to prevent an accidental fire and gas leakage caused by upset and impact. The cylinder 810 is additionally equipped with a gas sensor, and the gas blocking device blocks the fuel supplied to the burner 814 according to a signal of the gas sensor. The heating system 600 includes further a warning device that senses the gas leakage and then gives a warning.

According to the second embodiment, as intake and exhaust for combustion are separately arranged and thus indoor air is not directly in contact with exhaust gas, a risk of being exposed to the exhaust gas is free. Further, as the exhaust gas is not directly inhaled to the indoor area, a risk of suffocation is also free.

According to the second embodiment, high temperature combustion gas generated by the burner is used for indoor heating and hot water heating through a portion in which the air and the exhaust gas perform heat exchange and a portion in which the heating water and the exhaust gas perform heat exchange.

According to the second embodiment, it is possible to minimize energy waste after combustion by using the exhaust gas for vaporization and temperature increase of the liquefied fuel before final emission.

The terms, such as "include", "constitute", or "have" described herein means that corresponding component is inherent so long as there is no special description of opposite meaning, and thus should be construed as not excluding another component but further including another component. All terms including technical terms and scientific terms should be understood to have the same meaning as what is generally construed by those skilled in the art so long as it is differently defined. General term such as terms defined in a dictionary should be construed to be equal to the meaning of a context of the related art, and should not construed as ideal or excessive formal meaning so long as it is not clearly defined in the present invention.

The foregoing description and the accompanying drawings are provided only to illustrate the technical conception of the present invention, but it will be understood by a person having ordinary skill in the art that various modifications and changes such as combinations, separations, substitutions, and alterations of the components may be made without departing from the scope of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. An electric vehicle heating system, comprising:
   an intake port in which an air is injected into a cylinder;
   a burner of which an exterior surface is in contact with the air in the cylinder and which combusts fuel to generate combustion heat;
   a first heat exchanger which heats the air in the cylinder by using combustion heat supplied through a first channel pipe;
   a second heat exchanger which heats heating water by using combustion heat supplied through a second channel pipe;
   a flow controller including a three way valve of which a first side is connected to the first channel pipe, of which a second side is connected to the second channel pipe, of which a third side is connected to an exhaust port, and which regulates an amount of combustion heat flowing through each of the first channel pipe and the second channel pipe;

a heating port which emits heated air into an indoor area; and a pump which circulates the heating water around a battery, wherein the electric vehicle heating system blocks up the second channel pipe and supplies the combustion heat through only the first channel pipe upon expiration of a period of time from when the electric vehicle heating system is started.

2. The electric vehicle heating system according to claim 1, wherein exterior surfaces of the first heat exchanger and the second heat exchanger are in contact with the air in the cylinder.

3. The electric vehicle heating system according to claim 1, further comprising a third heat exchanger which heats the fuel by using combustion heat remaining in the exhaust port.

4. The electric vehicle heating system according to claim 3, wherein the third heat exchanger is positioned at an outside of the cylinder.

5. The electric vehicle heating system according to claim 1, wherein the fuel is butane or propane.

6. The electric vehicle heating system according to claim 1, wherein the combustion heat is transmitted to the first channel pipe and the second channel pipe with exhaust gas of the burner.

7. A method of controlling an electric vehicle heating system including a three way valve of which a first side is connected to the first channel pipe, of which a second side is connected to the second channel pipe, and of which a third side is connected to an exhaust port, comprising:

generating combustion heat by combusting fuel;

heating indoor air by using heat of a first channel pipe;

heating battery heating water by using heat of a second channel pipe;

controlling distribution of the combustion heat into the first channel pipe and the second channel pipe; and blocking up the second channel pipe and supplying the combustion heat through only the first channel pipe upon expiration of a period of time from when the electric vehicle heating system is started.

8. The method of controlling the electric vehicle heating system according to claim 7, wherein, in the controlling step, an operation signal of a driver is recognized and the distribution of the combustion heat is controlled depending on the operation signal.

9. The method of controlling the electric vehicle heating system according to claim 7, wherein, in the controlling step, an amount of the combustion heat supplied to the first channel pipe is controlled according to a set condition of indoor temperature.

* * * * *